US011887770B2

(12) United States Patent
Song et al.

(10) Patent No.: US 11,887,770 B2
(45) Date of Patent: Jan. 30, 2024

(54) COIL COMPONENT

(71) Applicant: SAMSUNG ELECTRO-MECHANICS CO., LTD., Suwon-si (KR)

(72) Inventors: Hyeon Yu Song, Suwon-si (KR); Hyung Ho Kim, Suwon-si (KR); Sung Jin Park, Suwon-si (KR); Sang Ho Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 473 days.

(21) Appl. No.: 17/085,209

(22) Filed: Oct. 30, 2020

(65) Prior Publication Data

US 2021/0210272 A1 Jul. 8, 2021

(30) Foreign Application Priority Data

Jan. 8, 2020 (KR) ........................ 10-2020-0002379

(51) Int. Cl.

*H01F 5/00* (2006.01)
*H01F 27/28* (2006.01)
*H01F 27/29* (2006.01)
*H01F 41/02* (2006.01)
*H01F 41/04* (2006.01)
*H01F 27/255* (2006.01)

(52) U.S. Cl.

CPC ....... *H01F 27/2804* (2013.01); *H01F 27/255* (2013.01); *H01F 27/29* (2013.01); *H01F 41/0246* (2013.01); *H01F 41/041* (2013.01); *H01F 2027/2809* (2013.01)

(58) Field of Classification Search

CPC .................................................. H01L 27/2804
USPC .................................................. 336/192, 200
See application file for complete search history.

(56) References Cited

U.S. PATENT DOCUMENTS

2012/0274429 A1 11/2012 Ogawa et al.
2016/0172098 A1 6/2016 Jeong et al.
2017/0032882 A1* 2/2017 Yang .................. H01F 27/2804

(Continued)

FOREIGN PATENT DOCUMENTS

CN 105702434 A 6/2016
CN 108231339 A 6/2018

(Continued)

OTHER PUBLICATIONS

Korean Office Action dated Mar. 16, 2021 issued in Korean Patent Application No. 10-2020-0002379 (with English translation).

(Continued)

*Primary Examiner* — Ronald Hinson
(74) *Attorney, Agent, or Firm* — Morgan, Lewis & Bockius LLP

(57) ABSTRACT

A coil component includes a wound coil having a winding portion, having at least one turn, and a lead-out portion extending from an end portion of the winding portion to provide a separation space together with the winding portion and a body including an insulating resin and magnetic powder particles and embedding the wound coil therein. The body has a low-density portion disposed in the separation space and having magnetic powder particle density lower than average magnetic powder particle density of an entirety of the body.

17 Claims, 5 Drawing Sheets

I-I'

(56) References Cited

U.S. PATENT DOCUMENTS

| | | | | |
|---|---|---|---|---|
| 2018/0182531 | A1* | 6/2018 | Muneuchi | H01F 27/255 |
| 2019/0180909 | A1 | 6/2019 | Shinohara et al. | |
| 2019/0304669 | A1 | 10/2019 | Hirama et al. | |
| 2020/0075222 | A1* | 3/2020 | Ogasawara | H01F 17/045 |

FOREIGN PATENT DOCUMENTS

| | | | |
|---|---|---|---|
| CN | 109935450 | A | 6/2019 |
| JP | 2012-234867 | A | 11/2012 |
| JP | 2015-144166 | A | 8/2015 |
| JP | 2019-186279 | A | 10/2019 |
| KR | 10-2015-0139267 | A | 12/2015 |
| KR | 10-2018-0073488 | A | 7/2018 |

OTHER PUBLICATIONS

Office Action dated Nov. 23, 2023 issued in the corresponding Chinese Patent Application No. 202011604005.7 with English translation.

* cited by examiner

I-I'

'B'

COIL COMPONENT

CROSS-REFERENCE TO RELATED APPLICATION(S)

This application claims the benefit under 35 USC 119 (a) of Korean Patent Application No. 10-2020-0002379 filed on Jan. 8, 2020 in the Korean Intellectual Property Office, the entire disclosure of which is incorporated herein by reference for all purposes.

TECHNICAL FIELD

The present disclosure relates to a coil component.

BACKGROUND

An example of a coil component is a wound coil component using a magnetic mold and a wound coil.

A wound coil forms a winding portion by winding a metal wire, having an insulating coating layer formed on a surface thereof, two or more times. In this case, both ends of the metal wire are processed to extend from both ends of the winding portion to be in parallel to each other (first processing). Both ends of the first-processed metal wire are bent in a direction perpendicular to a direction in which they extend (second processing, forming process).

Due to external force of the above-mentioned forming process, the insulating coating layer between an outermost turn of the winding portion and both ends of the metal wire may be damaged, and the metal wire of the winding portion may be exposed outwardly within a corresponding region.

SUMMARY

An aspect of the present disclosure is to provide a coil component which may reduce a leakage current.

According to an aspect of the present disclosure, a coil component includes a wound coil having a winding portion, having at least one turn, and a lead-out portion extending from an end portion of the winding portion to provide a separation space together with the winding portion and a body including an insulating resin and magnetic powder particles and embedding the wound coil therein. The body has a low-density portion disposed in the separation space and having magnetic powder particle density lower than average magnetic powder particle density of an entirety of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
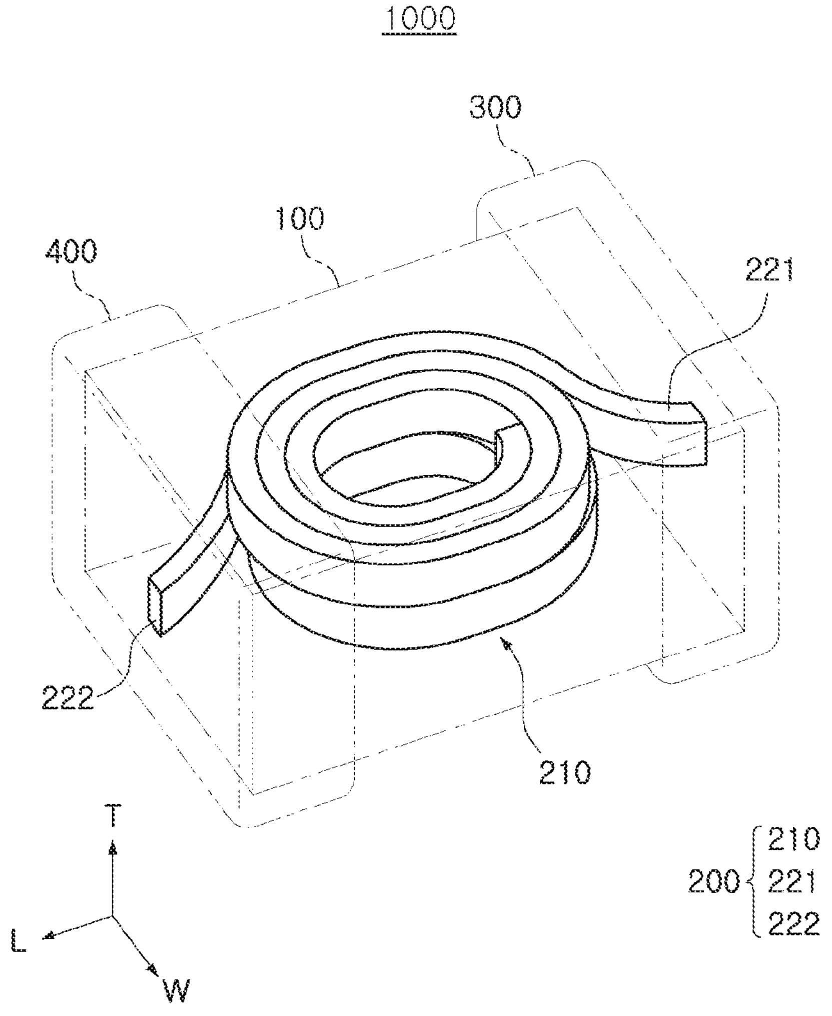
FIG. 1 is a schematic view of a coil component according to an example embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

A value used to describe a parameter such as a 1-D dimension of an element including, but not limited to, “length,” “width,” “thickness,” diameter,” “distance,” “gap,” and/or “size,” a 2-D dimension of an element including, but not limited to, “area” and/or “size,” a 3-D dimension of an element including, but not limited to, “volume” and/or “size”, and a property of an element including, not limited to, “roughness,” “density,” “weight,” “weight ratio,” and/or “molar ratio” may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, an L direction is a first direction or a length (longitudinal) direction, a W direction is a second direction or a width direction, a T direction is a third direction or a thickness direction.

Hereinafter, a coil component according to an example embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
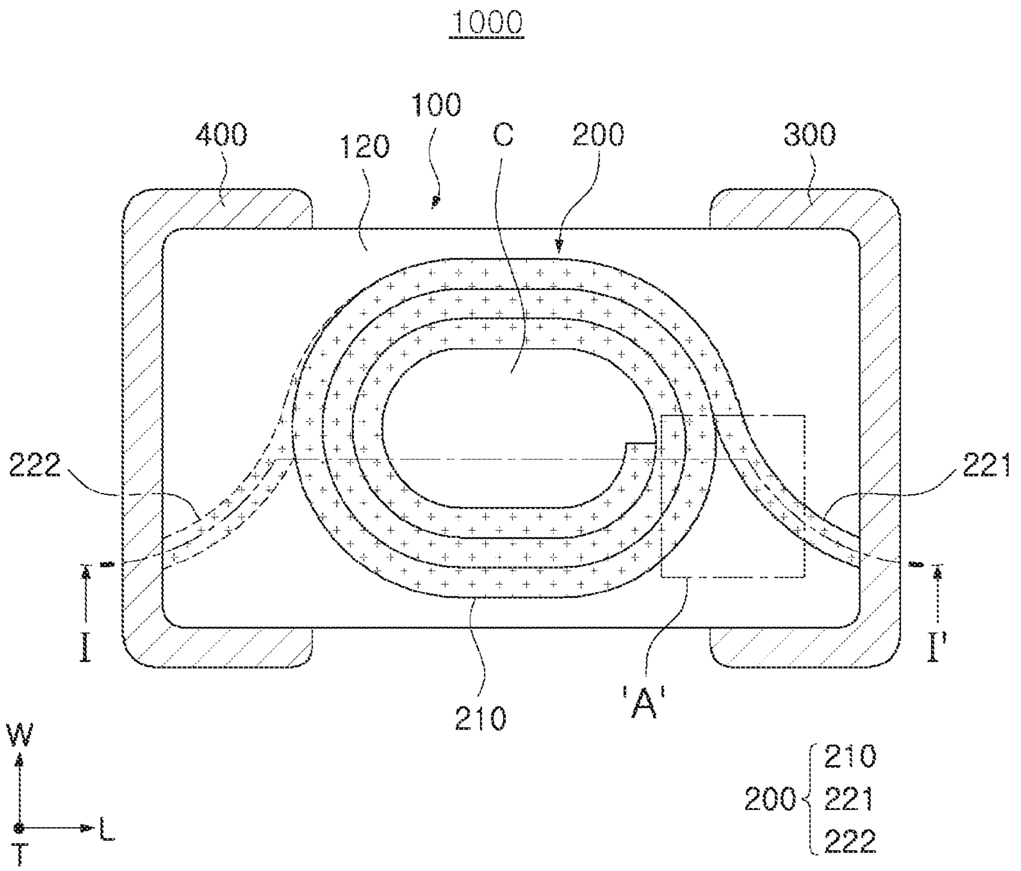
FIG. 2 is a plan view of FIG. 1.
Figure 3:
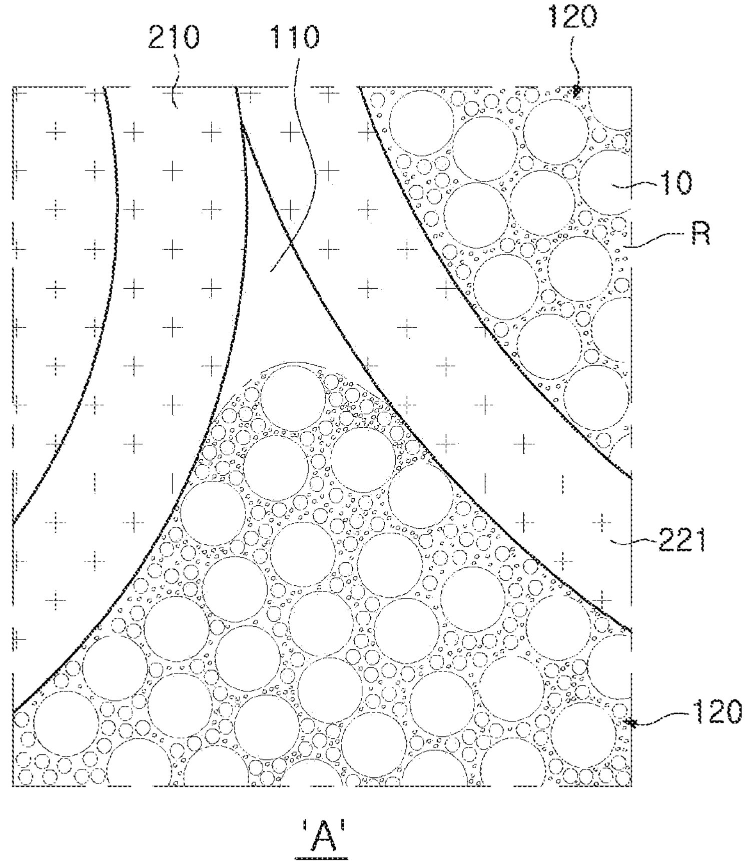
FIG. 3 is an enlarged view of portion ‘A’ of FIG. 3.
Figure 4:
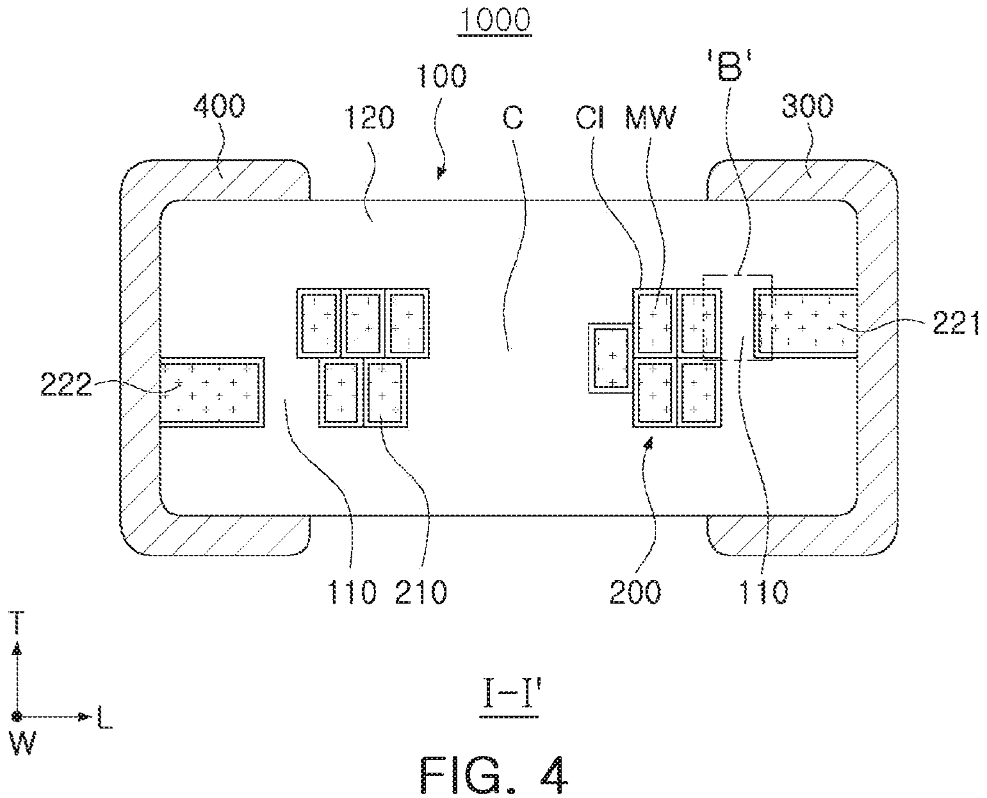
FIG. 4 is a cross-sectional view taken along line I-I' in FIG. 2.
Figure 5:
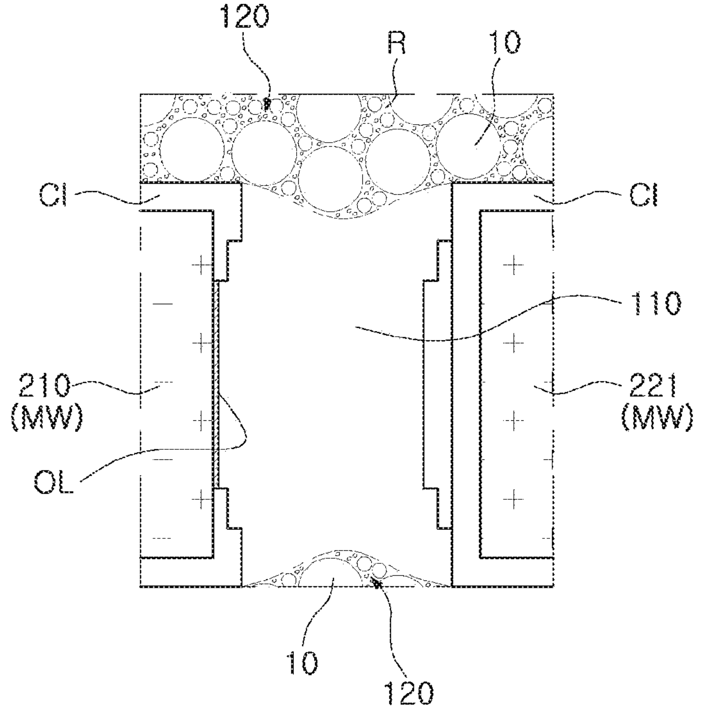
FIG. 5 is an enlarged view of portion ‘B’ of FIG. 4.

FIG. 1 is a schematic view of a coil component according to an example embodiment of the present disclosure. FIG. 2 is a plan view of FIG. 1. FIG. 3 is an enlarged view of portion ‘A’ of FIG. 3. FIG. 4 is a cross-sectional view taken along line I-I' in FIG. 2. FIG. 5 is an enlarged view of portion ‘B’ of FIG. 4.

Referring to FIGS. 1 to 5, a coil component 1000 according to an example embodiment includes a body 100, a wound coil 200, and external electrodes 300 and 400. The body 100 has a low-density portion 110 and a high-density portion 120, and includes magnetic power particles 10 and an insulating resin R.

The body 100 may form an exterior of the coil component 1000, and may embed the wound coil 200 therein.

As an example, the body 100 may be formed to have a hexahedral shape overall.

Based on FIG. 1, the body 100 has a first surface and a second surface opposing each other in a length direction L, a third surface and a fourth surface opposing each other in a width direction W, and a fifth surface and a sixth surface opposing each other in a thickness direction T. Each of the first to fourth surfaces of the body 100 may correspond to a wall surface of the body 100 connecting the fifth surface and the sixth surface of the body 100. Hereinafter, both end surfaces of the body 100 may refer to the first surface and the second surface of the body 100, respectively, both side surfaces of the body 100 may refer to the third surface 103 and the fourth surface 104 of the body 100, respectively, and one surface and the other surface of the body 100 may refer to the sixth surface and the fifth surface of the body 100, respectively.

The body 100 may be formed such that the coil component 1000, including the external electrodes 300 and 400 to be described later, has a length of 2.0 mm, a width of 1.2 mm, and a thickness of 0.65 mm, but is not limited thereto.

The body 100 includes the magnetic powder particles 10 and the insulating resin R. As an example, the body 100 may be formed by laminating a magnetic composite sheet, including the magnetic powder particles 10 and the insulating resin R, on upper and lower portions of the wound coil 200 to be described later. As another example, the body 100 may be formed by locating the wound coil 200 in a mold and filling the mold with a magnetic composite material including the magnetic powder particles 10 and the insulating resin R. In the above-mentioned examples, a core C of the body 100 may be formed by filling an empty space of a winding portion 210 of the wound coil 200 to be described later, with a magnetic composite sheet or a magnetic composite material, but a method of forming the core C is not limited thereto.

The magnetic powder particles 10 may be, for example, ferrite powder particles or metal magnetic powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

Hereinafter, it will be assumed that the magnetic powder particles 10 are metal magnetic powder particles, but the present disclosure is not limited thereto.

The metal magnetic powder particle may be amorphous or crystalline. For example, the metal magnetic powder particle may be a Fe—Si—B—Cr-based amorphous alloy powder particle, but is not limited thereto.

Each of the ferrite powder particles and the metal magnetic powder particles may have an average diameter of about 0.1 μm to 50 μm, respectively, but is not limited thereto.

An insulating coating layer may be formed on a surface of the metal magnetic powder particle 10. The metal magnetic powder particles 10 may have conductivity, and the insulating coating layer may surround the surface of the metal magnetic powder particle 10 to prevent short-circuit of the metal magnetic powder particle 10. The insulating coating layer may include an epoxy, a polyimide, a liquid crystal polymer, or the like, in a single form or in combined forms, but is not limited thereto. For example, a material and a forming method of the insulating coating layer may vary as long as the insulating coating layer may be formed of an electrically insulating material on the surface of the metal magnetic powder particle 10.

The body 100 may include two or more types of metal magnetic powder particles 10. In this case, the term "different types of metal magnetic powder particles" means that the magnetic powder particles are distinguished from each other by diameter, composition, crystallinity, and a shape. In FIGS. 3 and 5, the body 100 is illustrated as including three types of metal magnetic powder particles 10 having different particle size distributions to each other (trimodal). Unlike this, the body 100 may include two types of metal magnetic powder particles 10 having different particle size distributions to each other (bimodal). Since the body 100 includes two or more types of metal magnetic powder particles 10 having different particle size distributions to each other, a volume of the metal magnetic powder particles 10 in the body 100 may be increased (an increase in a filling rate).

The insulating resin R may include an epoxy, a polyimide, a liquid crystal polymer, or the like, in a single form or in combined forms, but is not limited thereto.

The body 100 may have the low-density portion 110 and the high-density portion 120 having higher density of magnetic power particles than the low-density portion 110. This will be described in detail later.

The wound coil 200 is embedded in the body 100 to exhibit characteristics of the coil component. For example, when the coil component 1000 according to this embodiment is used as a power inductor, the wound coil 200 may serve to stabilize the power supply of an electronic device by storing an electric field as a magnetic field and maintaining an output voltage.

The wound coil 200 includes the winding portion 210, an air-cored coil, and lead-out portions 221 and 222, respectively extending from both ends of the winding portion 210 to be exposed to the first and second surfaces of the body 100.

The winding portion 210 may be formed by winding a metal wire MW, such as a copper wire having a surface covered with an insulating coating portion CI in a spiral shape. As a result, each turn of the winding portion 210 has a form covered with an insulating coating portion CI. The winding portion 210 may include at least one layer. Each layer of the winding portion 210 is formed to have a planar spiral shape, and may have at least one turn.

The lead-out portions 221 and 222 extend from both end portions of the winding portion 210 to be exposed to the first and second surfaces of the body 100, respectively. The lead-out portions 221 and 222 may be integrated with the winding portion 210. The winding portion 210 and the lead-out portions 221 and 222 may be integrated with each other using the metal wire MW coated with the insulating coating portion CI. The lead-out portions 221 and 222 may be both end portions of the metal wire MW coated with the insulating coating portion CI.

In the case of a wound coil applied to a wound coil component, a metal wire having an insulation-coated surface may be wound by a winder to form a winding portion having at least one turn (first processing). The first-processed metal wire may have both end portions, respectively extending from an outermost turn of the winding portion and extending in substantially the same direction to be parallel to each other. When the wound coil, in which both end portions of the metal wire are disposed parallel to each other, is embedded in the body, both of the first and second lead-out portions of the wound coil may be exposed on one surface of the body. Accordingly, a process of increasing a distance between both of the end portions of the first-processed metal wire may be performed to expose the first and second lead-out portions of the wound coil to both surfaces of the body opposing each other, respectively (second processing, forming process).

In the second processing, since external force is applied to both end portions of the metal wire in a direction in which both end portions of the metal wire oppose each other, one area of an outermost turn of the winding portion and one area of both end portions of the metal wire, disposed to be in contact with each other, are separated from each other. However, in the process, an insulating coating portion of one region of the outermost turn of the winding portion and/or one region of each of both end portions of the metal wire may be damaged to expose the metal wire to an external entity. In the case in which the insulating coating portion is damaged, when the body surrounding the wound coil includes conductive metal magnetic powder particles, leakage current may be generated to deteriorate component characteristics.

In this embodiment, to address the above-described issue, the low-density portion 110 fills a separation space between the winding portion 210 and the lead-out portions 221 and 222. The low-density portion 110 is one component of the body 100, in which density of the metal magnetic powder particles is lower than average density of metal magnetic powder particles of the entire body 100. Accordingly, the coil component 1000 according to this embodiment may reduce leakage current. For example, the metal magnetic powder particles 10 may be disposed at relatively low density in the space, between the winding portion 210 and the lead-out portions 221 and 222 spaced apart from each other, in which there is the possibility that the insulating coating portion CI is damaged.

In this specification, “the separation space between the winding portion 210 and the first lead-out portion 221” may refer to, for example, a fan-shaped region formed by, based on a cross section in a length-width direction (L-W), a tangent of each of the winding portion 210 and the first lead-out portion on a contact point between the winding portion 210 and the first lead-out portion 221 and a circle centering on the contact point and having a radius, an average diameter of a metal magnetic powder particle having a largest diameter, among the plurality of metal magnetic powder particles (for example, a circle having a radius of 50 μm or less when $D_{50}$ of a metal magnetic powder particle 10 having a largest diameter is 50 μm). Alternatively, “the separation space between the winding portion 210 and the first lead-out portion 221” may refer to a region between a surface of the winding portion 210, including the entirety of the fan-shaped region, and a surface of the first lead-out portion 221, based on a cross section in a length-width (L-W) direction. Alternatively, “the separation space between the winding portion 210 and the first lead-out portion 221” may refer to a region between a surface of the winding portion 210, including a portion of the fan-shaped region, and a surface of the first lead-out portion 221, based on a cross section in a length-width (L-W) direction. The above-described description may be similarly applied to a separation space between the winding portion 210 and the second lead-out portion 222. In this specification, “the metal magnetic powder particle 10 has low density” means that a filling rate of the metal magnetic powder particle 10 is relatively low when comparing one region and another region having the same volume with each other.

In FIGS. 3 and 5, the low-density portion 110 is illustrated as not including the metal magnetic powder particles 10. However, this is merely illustrative for understanding of the present disclosure and ease of description. Therefore, the scope of the present disclosure is not limited to an example of the low-density portion 110 illustrated in FIGS. 3 and 5.

The low-density portion 110 and the high-density portion 120 may be formed by, for example, forming a high-density portion forming material on an upper portion and a lower portion of the wound coil after filling the separation space between the winding portion 210 of the second-processed wound coil 200 with a low-density portion forming material. The low-density portion forming material and the high-density portion forming material may each include the same curable insulating resin and/or different curable insulating resins, and may be first and second magnetic composite resins having different filling rates of metal magnetic powder particles. A first magnetic composite resin, the low-density portion forming material, has a lower filling rate of the metal magnetic powder particles 10 than a second magnetic composite resin, the high-density portion forming material. Therefore, the density of the metal magnetic powder particles 10 in the first magnetic composite resin may be lower than the density of the metal magnetic powder particles 10 in the second magnetic composite resin, the high-density portion forming material, and the high-density portion forming material may be a magnetic composite sheet including the second magnetic composite resin. In the above example, when the insulating resin included in each of the low-density portion forming material and the high-density portion forming material is the same resin or a curable resin capable of being cross-linked to each other, the low-density portion 110 and the high-density portion 120 of the body 100 may be integrated with each other, and thus, a boundary may not be vertically formed.

As another example, the low-density portion forming material may not include the metal magnetic powder particles 10, and only the high-density portion forming material may include the metal magnetic powder particles 10. In this case, the metal magnetic powder particles 10, included in the high-density portion forming material, may be prevented from flowing into the separation space during a process of laminating and curing the high-density portion forming material on the upper and lower portions of the wound coil 200. When the low-density portion forming material includes an insulating resin, the insulating resin included in the low-density portion forming material may have a melting point lower than a curing temperature of the insulating resin included in the high-density portion forming material. The insulating resin included in the low-density portion forming material may be, for example, a wax having a melting point lower than a curing temperature of an epoxy resin included in the high-density portion forming material, but the scope of the present disclosure is limited thereto. The insulating resin included in the low-density portion forming material may be melted during a curing process of forming the body 100 to decrease concentration (density) in a direction toward the surface of the body 100 from the separation space.

In the above-described examples, when the low-density portion forming material is a liquid material, the low-density portion forming material disposed in the separation space may have an inwardly curved shape in a direction toward a contact point between the winding portion 210 and the first lead-out portion 221 due to surface tension of the low-density portion forming material, a liquid material.

The coil component 1000 according to this embodiment may further include a metal oxide layer OL formed on a surface of the exposed metal wire MW. Referring to FIGS. 4 and 5, as described above, the insulating coating portion CI in one region of the outermost turn of the winding portion 210 and/or one region of the lead-out portions 221 and 222 may be damaged due to the second processing (the forming process) to expose the metal wire MW. The metal oxide layer OL may be formed on the surface of the exposed metal wire MW to reduce leakage current. A process of forming the metal oxide layer OL may be performed between the second processing (the forming process) and a process of forming the low-density portion forming material. In one example, a thickness of the metal oxide layer OL may be less than a thickness of the insulating coating portion CI, but the thickness relation is not limited thereto. In one example, the metal oxide layer OL and the insulating coating portion CI may be made of different insulating materials, but the materials for forming the metal oxide layer OL and the insulating coating portion CI are not limited thereto.

The external electrodes 300 and 400 are disposed on the first and second surfaces of the body 100 to be in contact with and connected to the lead-out portions 221 and 222, respectively. Specifically, the first external electrode 300 is disposed on the first surface of the body 100 to be connected to the first lead-out portion 221, and the second external electrode 400 is disposed on the second surface of the body 100 to be connected to the second lead-out portion 222.

Each of the external electrodes 300 and 400 may be formed of a conductive material such as copper (Cu), aluminum (Al), silver (Ag), tin (Sn), gold (Au), nickel (Ni), lead (Pb), chromium (Cr), titanium (Ti), or alloys thereof, but a material thereof is not limited thereto.

Each of the external electrodes 300 and 400 may be formed to have a single-layer structure or a multilayer structure. For example, the first external electrode 200 may include a first layer including copper (Cu), a second layer disposed on the first layer and including nickel (Ni), and a third layer disposed on the second layer and including tin (Sn). Each of the first to third layers may be formed by electroplating, but a forming method thereof is not limited thereto. Each of the external electrodes 300 and 400 may include a conductive resin layer and an electroplating layer. The conductive resin layer may be formed by applying and curing conductive powder particles, including silver (Ag) and/or copper (Cu), and a conductive paste including an insulating resin such as epoxy, or the like.

In the coil component 1000 according to this embodiment, the low-density portion 110 having relatively low density of the metal magnetic powder particles 10 may fill the separation space between the winding portion and the lead-out portions 221 and 222, in which there is high possibility that leakage current is generated, to reduce leakage current.

Figure 6:
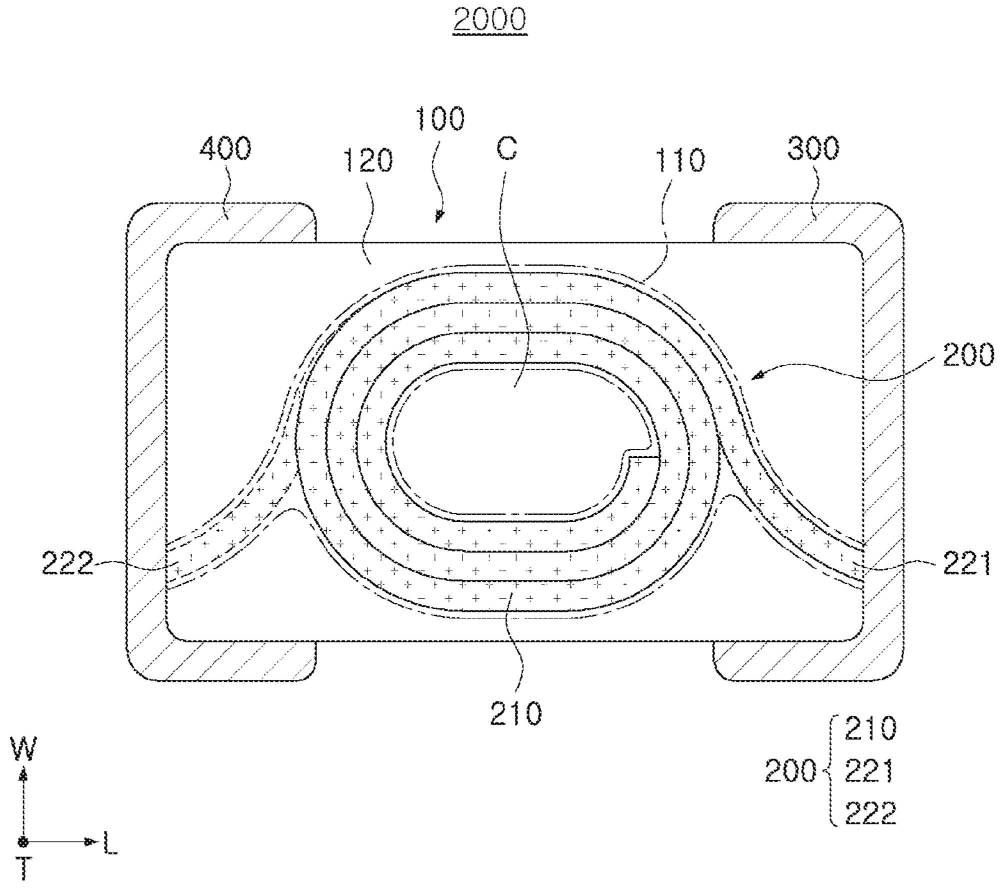
FIG. 6 is a schematic view of a coil component according to another example embodiment of the present disclosure, and is a view corresponding to FIG. 2.

FIG. 6 is a schematic view of a coil component according to another example embodiment of the present disclosure, and is a view corresponding to FIG. 2.

When comparing FIG. 6 with FIGS. 1 to 5, the coil component 2000 according to this embodiment is different from the coil component 1000 according to one example embodiment in a location relationship between a low-density portion 110 and a wound coil 200. Therefore, only a location of the low-density portion 110, different from that of the coil component 1000 according to one example embodiment, will be described and the descriptions of the one example embodiment may be applied, as it is, to the other components of this embodiment.

Referring to FIG. 6, the low-density portion 110 may be disposed to surround the entire surface of the wound coil 200 having the separation space between the winding portion 210 and the lead-out portions 221 and 222.

The low-density portion 110, applied to this embodiment, may be formed by dipping the wound coil 200, subjected to second processing (forming process), into a liquid low-density portion forming material and solidifying the liquid low-density portion forming material coating a surface of the wound coil. Ultimately, the low-density portion 110 may be formed from the solidified low-density portion forming material by forming and curing a high-density portion forming material on an upper portion and a lower portion of the wound coil.

The low-density portion forming material may include an insulating resin having a melting point lower than a curing temperature of the insulating resin R included in the high-density portion forming material. For example, the low-density portion forming material may be a wax having a melting point lower than a curing temperature of an epoxy resin, or the like, included in the high-density portion forming material. In this case, concentration (density) of the insulating resin included in the low-density portion forming material may be reduced in a direction from the surface of the wound coil 200 toward the surface of the body 100 in an end product.

An insulating resin having a relatively low melting point of the low-density portion forming material may be disposed to have an average thickness of 10 μm or less from the surface of the wound coil 200. When the thickness of the insulating resin having a low melting point based on an end product is greater than 10 μm on average, a volume occupied by the low-density portion 110 in the end product is relatively large, and thus, characteristics of the component may be deteriorated.

The metal oxide layer OL, described in the coil component 1000 according to one example embodiment, may be equivalently applied to this embodiment.

In this embodiment, after the second processing is performed on the wound coil 200, the low-density portion forming material may surround the entire surface of the wound coil 200 to coat the entire surface of the wound coil 200 with the low-density portion 110. Thus, leakage current may be prevented more reliably.

As described above, according to example embodiments, leakage current of a coil component may be reduced.

While example embodiments have been shown and described above, it will be apparent to those skilled in the art that modifications and variations could be made without departing from the scope of the present disclosure as defined by the appended claims.

What is claimed is:

1. A coil component comprising:

a wound coil having a winding portion, having at least one turn, and a lead-out portion extending from an end portion of the winding portion at a contact point to provide a separation space together with the winding portion; and a body including an insulating resin and magnetic powder particles and embedding the wound coil therein, wherein the body has a low-density portion disposed in the separation space and having magnetic powder particle density lower than average magnetic powder particle density of an entirety of the body, and wherein the low-density portion extends from the contact point.

2. The coil component of claim 1, wherein the low-density portion surrounds a surface of the wound coil having the separation space.

3. The coil component of claim 2, wherein the body further includes a low-melting-point resin included in the low-density portion and having a melting point lower than a curing temperature of the insulating resin.

4. The coil component of claim 3, wherein the low-melting-point resin has density increased in a direction toward the surface of the wound coil.

5. The coil component of claim 3, wherein the low-melting-point resin is disposed within 10 micrometers of the surface of the wound coil.

6. The coil component of claim 1, wherein the wound coil includes a metal wire and an insulating coating portion surrounding the metal wire, and the metal wire of an outermost turn of the winding portion is exposed to the separation space.

7. The coil component of claim 6, further comprising a metal oxide layer disposed on a surface of the exposed metal wire.

8. The coil component of claim 1, further comprising:

an external electrode disposed on a surface of the body and disposed to be in contact with or connected to the lead-out portion exposed to the surface of the body.

9. A coil component comprising:

a body including an insulating resin and magnetic powder particles; and a wound coil having a winding portion and a lead-out portion extending from an end portion of the winding portion at a contact point to be spaced apart from the winding portion, and embedded in the body, wherein the body comprises:

a low-density portion covering a surface of the wound coil having a separation space between the winding portion and the lead-out portion; and a high-density portion disposed outside of the low-density portion and having higher density of the magnetic powder particles than the low-density portion, and wherein the low-density portion extends from the contact point.

10. The coil component of claim 9, wherein the low-density portion and the high-density portion are integrated with each other.

11. The coil component of claim 9, wherein the body further includes a low-melting-point resin having a melting point lower than a curing temperature of the insulating resin, and density of the low-melting-point resin is higher in the low-density portion than in the high-density portion.

12. A coil component comprising:

a wound coil having a winding portion, having at least one turn, and a lead-out portion extending from an end portion of the winding portion at a contact point to provide a separation space together with the winding portion; and a body including a first insulating resin and magnetic powder particles and embedding the wound coil therein, wherein the body further includes a second insulating resin disposed in the separation space and having a melting point lower than a curing temperature of the first insulating resin, and wherein the second insulating resin extends from the contact point.

13. The coil component of claim 12, wherein the first insulating resin surrounds a surface of the wound coil having the separation space.

14. The coil component of claim 12, wherein the first insulating resin has a density increasing gradually in a direction toward a surface of the wound coil having the separation space.

15. The coil component of claim 12, wherein the second insulating resin is disposed within 10 micrometers from a surface of the wound coil having the separation space.

16. The coil component of claim 12, further comprising a metal oxide layer disposed on a surface of the wound coil.

17. The coil component of claim 12, wherein the second insulating resin separate the magnetic powder particles from a surface of the wound coil having the separation space.

* * * * *